UNITED STATES PATENT OFFICE.

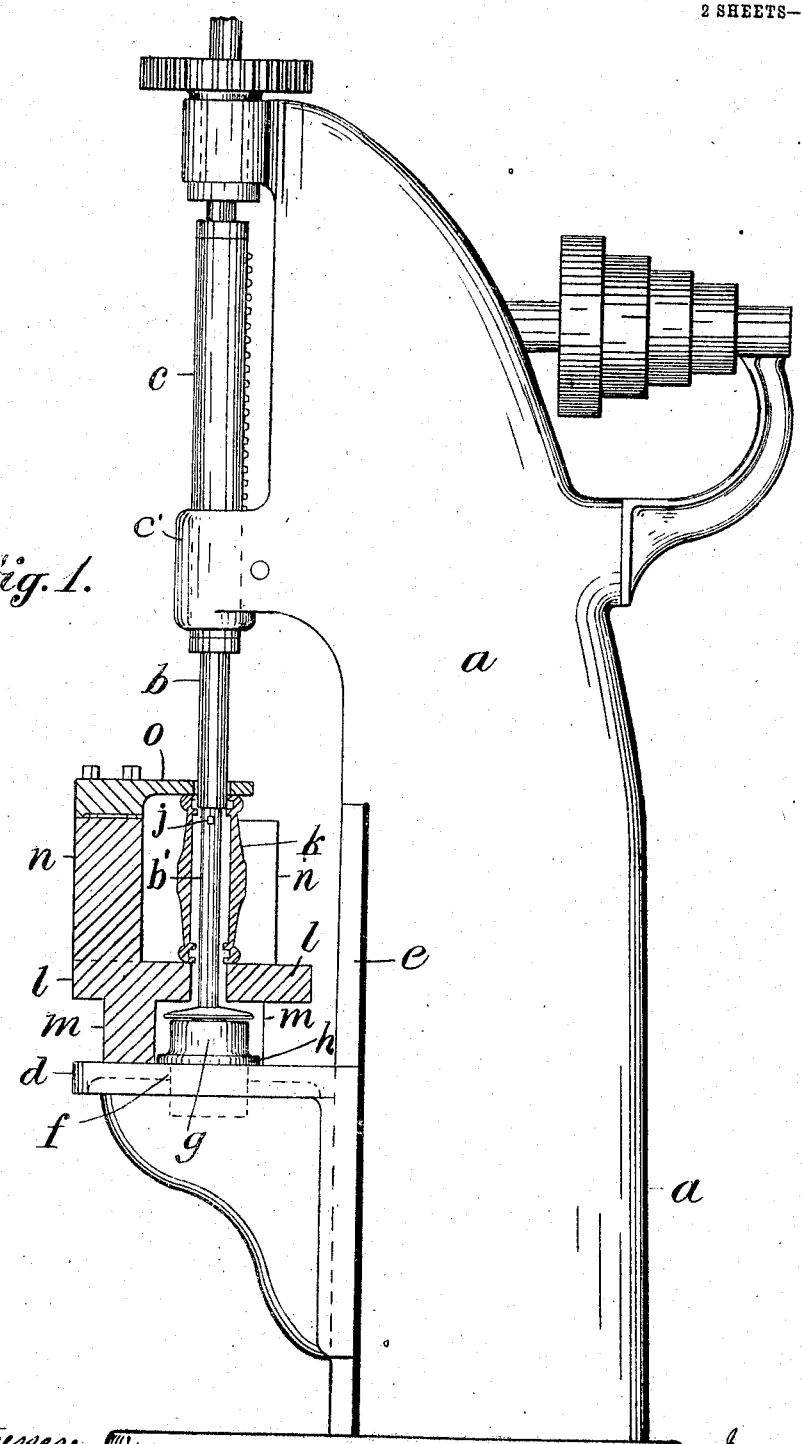

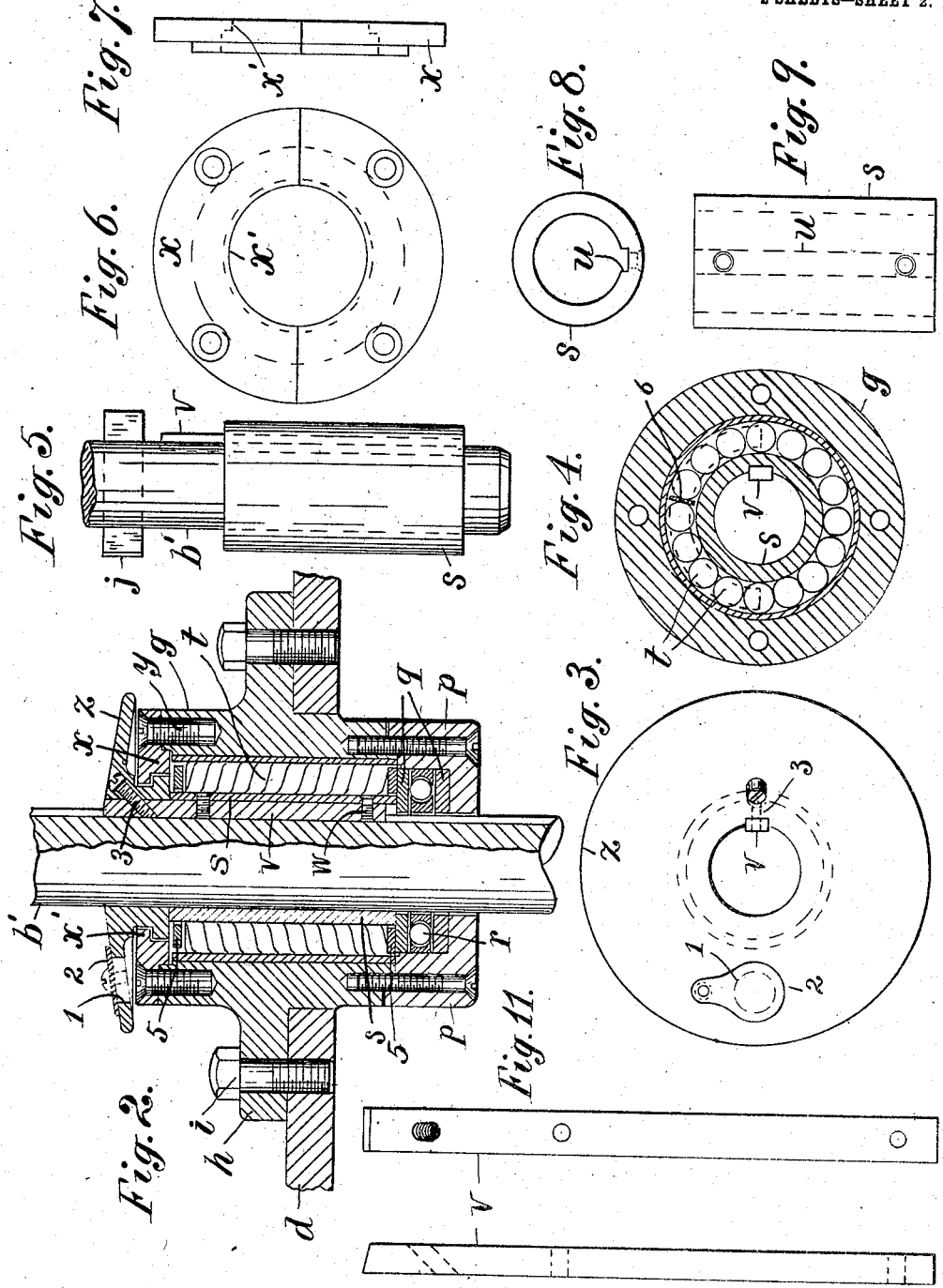

CEPHAS I. SHIRLEY, OF NEWARK, NEW JERSEY, ASSIGNOR TO HYATT ROLLER BEARING COMPANY, OF HARRISON, NEW JERSEY, A CORPORATION OF NEW JERSEY.

OUTBOARD-BEARING FOR BORING-SPINDLES.

936,576.    Specification of Letters Patent.    Patented Oct. 12, 1909.

Application filed February 10, 1908. Serial No. 415,034.

*To all whom it may concern:*

Be it known that I, CEPHAS I. SHIRLEY, a citizen of the United States, residing at 319 Clifton avenue, Newark, county of Essex, and State of New Jersey, have invented certain new and useful Improvements in Outboard-Bearings for Boring-Spindles, fully described and represented in the following specification and the accompanying drawings, forming a part of the same.

The present invention relates to an outboard bearing for the spindles of drilling machines, for use in cases where the drill-spindle is provided with boring-cutters intermediate to its free end and its main bearing and requires a support at its outer end during a boring operation.

The invention relates to that class of bearings which permit the spindle to move longitudinally while avoiding any rotary friction upon the spindle itself, and any consequent wear. In such constructions the outboard bearing is provided with a bushing fitted to move longitudinally upon the point of the spindle so that the spindle can slide therein, such bushing having means to engage the spindle to rotate therewithin an outboard bearing.

The present construction is designed for the spindles of drilling machines engaged in boring operations, as the work-table in drilling machines is of stationary construction, and thus holds the object stationary which is to be bored, while the rotary spindle carrying the boring-cutters is fed longitudinally through the object. The point or free end of the spindle which projects from its main bearing in such cases intersects the plane of the work-table so as to pass through a hole in the same, and the table may thus be provided with an outboard bearing of the class described, by which the free end of the spindle may be firmly supported. In the present invention the outboard bearing is made entirely detachable from the work-table so that its upward extension may not interfere with placing work upon the table when not used for boring. To prevent, as far as possible, the accumulation of chips and dirt upon the top of the outboard bearing as they fall from the cutter, I project the bearing somewhat above the work-table and provide a flange rotated with the spindle to cover the top of the bearing and throw the chips therefrom. The flange projects over the side of the casing to guard the bearing effectively from the chips. This application of the invention is shown in the annexed drawing, in which—

Figure 1 is a side elevation of the frame or column of a drill-press with the parts related to this improvement; Fig. 2 is a vertical section of the outboard bearing; Fig. 3 is a plan of the projecting flange; Fig. 4 is a cross section of the bearing just below the cap $x$; Fig. 5 is a side view of the bushing and spindle where engaged with the bushing; Fig. 6 is a plan, and Fig. 7 an edge view of the cap for the bearing; Fig. 8 is a plan, and Fig. 9 a side view of the bushing; Fig. 10 is an edge view, and Fig. 11 a side view of the feather, upon a larger scale than the other figures.

$a$ designates the column of the drill-press, $b$ the vertical spindle, $c$ the sleeve for feeding the same in the usual manner, and $c'$ the main bearing of the spindle.

The feeding mechanism and the connections for rotating the spindle are not shown, as they are well known and form no part of the present invention.

A boring-bar $b'$ is shown projected from the lower end of the spindle into an outboard bearing upon the work-table; but for convenience this boring-bar will be referred to herein as the spindle, as it participates in the rotary and longitudinal movements of the same.

$d$ is the work-table, which in practice is adjustable upon ways $e$ upon the front of the column, and secured thereon when adjusted.

For the purposes of this invention, the table is provided with an aperture $f$ in which the lower part of the outboard bearing is shown inserted, the body $g$ of the casing having a flange $h$ to rest upon the table, and secured thereon by bolts $i$, as shown in Fig. 2. The body $g$ is projected above the table so that the work-chips may fall off from its upper end, which is protected by a rotating flange larger than the body.

The spindle is shown in Fig. 1 provided with cutters $j$ adapted to bore the interior of a hanger-box $k$, and the box is shown carried by a work-support $l$ held upon the table above the outboard bearing by feet $m$, and having posts $n$ at the side of the spindle supporting a clamp-plate *o* at the top which holds the work-piece or hanger-box *k* firmly upon the support *l*. The feet hold the support *l* above the top of the body *g*. In the outboard bearing, this body *g* is provided with a bottom head *p* in which a thrust-collar is supported detachably and formed of the rings *q* and balls *r*. The bushing *s* rests upon the thrust-collar and is surrounded by anti-friction rolls *t*, and is provided with a keyway *u* in which a feather *v* is fitted and secured by screws or rivets *w*. A cap *x* is mounted on the casing and formed with an internal annular tongue *x'* and divided diametrically, as shown in Figs. 6 and 7, and secured upon the top of the body *g* by screws *y*. The flange *z* is fitted directly to the spindle *b* and formed to slide thereon and notched at one side, as shown in Fig. 3, to receive the upper end of the feather *v*, and has upon its under side a hub having a neck or groove to engage the annular tongue *x'*, which operates to hold it from displacement upon the top of the bearing. The cap *x* is divided as shown in Fig. 6 so as to engage the tongue and groove. The hub rests upon the top of the bushing *s*, as shown in Fig. 2, which supports it clear of the cap *x* so that it turns without any friction. The upper surface of the flange is projected downwardly toward its margin, so that the chips may be thrown off of the same when they fall thereon, and the edge of the flange projects beyond the body *g*, as shown in Fig. 2, so that the chips fall clear of the body. It is understood that the flange turns with the bushing and spindle. An aperture 1 is made through the flange *z* for access to the screws *y* in attaching the cap to the casing-body *g* after its halves are fitted to the neck of the flange, and such aperture is closed by a movable plate 2 to exclude the chips and dirt from the parts below. The flange *z* is made separate from the bushing so that it may be readily detached from the casing and slid upward upon the boring-bar whenever it is necessary to inspect the anti-friction rolls within the casing. A screw 3 is extended obliquely from the top of the flange into the feather to lock the flange thereto, the holes for such screws and for the screws *w* being shown in the feather in Fig. 11. The heads 5 are shown in Fig. 2, for the roll-guide 6, which is shown in Fig. 4 of the usual character in such bearings, to hold the rolls parallel within the casing.

It will be understood from the above description that I do not claim an outboard bearing broadly, but the particular constructions claimed herein which adapt my bearing for use with the table of an upright drill.

Having thus set forth the nature of the invention what is claimed herein is:

1. An outboard bearing for a splined drill-press spindle, comprising the casing *g* with the supporting-plate *h* projected from the casing below the top to rest upon the drill-press table, a bushing in the bearing with feather to engage the splined spindle, and the flange *z* fitted to the top of the bearing and projecting over the side of the casing, with space between the under side of such flange and the plate *h* for the accumulation of chips.

2. An outboard bearing for a splined drill-press spindle, comprising the casing *g*, a bushing in the bearing with feather to engage the splined spindle, the cap *x* divided in halves and secured upon the top of the casing and having the internal annular tongue *x'*, and the flange *z* necked to fit the annular tongue of the cap and engaged with the feather *v*, whereby the flange protects the entire top of the bearing and is held from any vertical displacement.

3. In an outboard bearing for a drill-press having a splined vertical spindle, the special construction for supporting the spindle in the bearing and also rotating a guard-flange above the bearing, comprising the casing having a top thereon, a bushing *s* for the spindle rotatably mounted in the casing with a feather *v* fitted to the spindle and the bushing and extended above the top of the casing, and the guard-flange *z* fitted to the spindle above the top of the casing and engaged with the feather and rotated thereby, substantially as shown and described.

4. An outboard bearing for a splined drill-press spindle, comprising the casing *g* with the supporting-plate *h* projected from the casing below the top to rest upon the drill-press table, a bushing within the bearing having feather fitted to the spline and projected above the top of the casing, the circular flange *z* fitted directly to the spindle and feather above the top of the casing, a collar with screws *y* to hold the flange *z* removably upon the top of the casing, and an aperture through the flange with movable cover 2 for access to the screws when required.

In testimony whereof I have hereunto set my hand in the presence of two subscribing witnesses.

CEPHAS I. SHIRLEY.

Witnesses:
  M. ELEDER,
  J. BLAIR.